(12) United States Patent
Grimm et al.

(10) Patent No.: US 11,702,360 B2
(45) Date of Patent: Jul. 18, 2023

(54) BOROSILICATE GLASS ARTICLE WITH LOW BORON CONTENT

(71) Applicant: Schott AG, Mainz (DE)

(72) Inventors: Malte Grimm, Mitterteich (DE); Christof Kass, Tirschenreuth (DE); Rainer Eichholz, Frankfurt am Main (DE)

(73) Assignee: Schott AG, Mainz (DE)

( * ) Notice: Subject to any disclaimer, the term of this patent is extended or adjusted under 35 U.S.C. 154(b) by 754 days.

(21) Appl. No.: 16/444,723

(22) Filed: Jun. 18, 2019

(65) Prior Publication Data

US 2019/0382303 A1 Dec. 19, 2019

(30) Foreign Application Priority Data

Jun. 18, 2018 (DE) .............. 10 2018 004 807.2

(51) Int. Cl.
*C03C 3/091* (2006.01)
*C03B 17/04* (2006.01)
*C03C 4/20* (2006.01)

(52) U.S. Cl.
CPC .............. *C03C 3/091* (2013.01); *C03B 17/04* (2013.01); *C03C 4/20* (2013.01); *C03C 2204/00* (2013.01)

(58) Field of Classification Search
CPC ................. C03C 3/089; C03C 3/091
See application file for complete search history.

(56) References Cited

U.S. PATENT DOCUMENTS

| | | | |
|---|---|---|---|
| 6,794,323 B2 | 9/2004 | Peuchert et al. | |
| 9,714,188 B2 | 7/2017 | Fu et al. | |
| 9,714,192 B2 | 7/2017 | Ellison et al. | |
| 10,570,052 B2 | 2/2020 | Kass | |
| 2003/0087745 A1* | 5/2003 | Peuchert | C03C 4/20 501/67 |
| 2014/0341883 A1* | 11/2014 | Weeks | A61K 38/37 424/130.1 |
| 2015/0037571 A1 | 2/2015 | Danielson et al. | |
| 2015/0152003 A1* | 6/2015 | Kawamoto | C03C 3/091 428/220 |

FOREIGN PATENT DOCUMENTS

| | | | |
|---|---|---|---|
| DE | 102 38 915 B3 | 4/2004 | |
| DE | 10238915 B3 * | 4/2004 | ............ C03C 3/091 |
| DE | 20 2010 014 985 U1 | 2/2011 | |
| DE | 202010014985 U1 * | 2/2011 | ............ C03C 3/091 |
| EP | 2 796 426 A1 | 10/2014 | |
| EP | 3 147 265 A1 | 3/2017 | |
| JP | 2014-169209 A | 9/2014 | |

OTHER PUBLICATIONS

Shuxia Zhou et al., "Biologies Formulation Factors Affecting Metal Leachables from Stainless Steel", AAPS PharmSciTech, vol. 12, No. 1, Mar. 2011 (11 pages).
Alexander Fluegel, "Global Model for Calculating Room-Temperature Glass Density from the Composition", J. Am. Ceram. Soc., 90 [8] 2622-2625, 2007 (4 pages).
A. Makishima and J.D. Mackenzie, "Direct Calculation of Young's Modulus of Glass", Journal of Non-Crystalline Solids, 12 (1973) 35-45 (11 pages).
European Search Report dated Dec. 4, 2019 for European Patent Application No. 19 18 0084 (4 pages).
European Office Action dated Dec. 19, 2019 for European Patent Application No. 19 18 0084 (4 pages).
Chinese Office Action dated Apr. 8, 2022 for Chinese Application No. 201910526829.8 (8 pages).

* cited by examiner

*Primary Examiner* — Elizabeth A. Bolden
(74) *Attorney, Agent, or Firm* — Taylor IP, P.C.

(57) ABSTRACT

A chemically temperable borosilicate glass article has a low boron content and a corresponding $Na_2O$ content. The articles have good diffusivities and hydrolytical resistance values. When chemically tempered, the borosilicate glass article exhibits a compressive stress CS >400 MPa and a penetration depth DoL >20 µm. A pharmaceutical primary packaging including the borosilicate glass article is also disclosed.

16 Claims, No Drawings

BOROSILICATE GLASS ARTICLE WITH LOW BORON CONTENT

BACKGROUND OF THE INVENTION

1. Field of the Invention

The invention relates to a borosilicate glass article with optimized hydrolytic, acid and alkali resistance and susceptibility to chemical tempering. The invention further relates to a method of using the article, in particular as a packaging article in the pharmaceutical field.

2. Description of the Related Art

Glass articles used in the medical, especially pharmaceutical, field must meet stringent quality criteria. Articles for pharmaceutical primary packaging such as vials, ampoules, cartridges and syringes must exhibit high transparency, good sterilizability, high mechanical resistance, low porosity and permeability combined with excellent chemical resistance.

Glass compositions for medical, in particular pharmaceutical, uses must satisfy high requirements, as the glass is usually in direct contact with solid and/or liquid material such as a medical composition. The glass must not change the quality of the material contained by or in contact with it in such a way that prescribed thresholds are exceeded, i.e. the glass material must not release any substances in quantities which, for example, impair the efficacy and stability of a contained drug or even render it toxic.

In order to provide glasses with higher mechanical resistance, it is known to temper them, in particular to temper them chemically. For this purpose, the glass is subjected to an ion exchange to form a compressive stress layer that prevents mechanical damage such as scratches or abrasion and is therefore much more resistant to damage. The ion exchange process works in such a way that, at the glass surface, smaller alkali metal ions, such as for instance sodium and/or lithium ions, are exchanged for larger alkali metal ions, such as potassium ions. The duration and temperature of the ion exchange process determines the exchange layer depth. If this ion exchange depth exceeds the depth of damage to the surface of the product during use, breakage is prevented.

Chemical tempering under ion exchange is carried out, for example, by immersion in a potassium-containing salt melt. It is also possible to use an aqueous potassium silicate solution, paste or dispersion, or to perform ion exchange by vapor deposition or temperature-activated diffusion. The first of the above-named methods is generally preferred.

Compressive stress layers are characterized by the parameters compressive stress and penetration depth:

Compressive stress (CS) ("Pressure stress" or "surface stress") is the stress that results from the displacement effect on the glass network through the glass surface after ion exchange, while no deformation occurs in the glass.

"Penetration depth" or "depth of ion exchanged layer" or "ion exchange depth" ("depth of layer" or "depth of ion exchanged layer", DoL) is the thickness of the glass surface layer in which ion exchange occurs and compressive stress is generated. The compressive stress CS and the penetration depth DoL can be measured optically, using the commercially available stress meter FSM6000.

"Diffusivity" D can be calculated from DoL and chemical tempering time t according to the following formula: $DoL = 1.4 * sqrt(4*D*t)$. In this disclosure, D will be given for chemical tempering in $KNO_3$ at 450° C. for 9 hours. The indication of a diffusivity does not mean that the respective article has undergone chemical tempering. The diffusivity describes the susceptibility of the article to chemical tempering in case of optional chemical tempering.

Ion exchange therefore means that the glass is hardened or chemically tempered by ion exchange processes, a process that is well known to the person skilled in the art in the field of glass making and processing. The typical salt used for chemical tempering is, for example, K+-containing molten salt or mixtures of salts. Salts conventionally used include $KNO_3$, KCl, $K_2SO_4$ or $K_2Si_2O_5$. Additives such as NaOH, KOH and other sodium salts or potassium salts are also used to better control the rate of ion exchange for chemical tempering.

The glass composition has a large influence on the penetration depths and surface stresses to be achieved.

Glasses frequently used in the pharmaceutical industry are borosilicate glasses (so-called neutral glasses), with the principal components silicon oxide and boron oxide, but which may also contain aluminum, alkali metal and alkaline earth oxides.

In order to modify and improve the properties of a glass in the desired way and to adapt it better to special applications, the person skilled in the art always considers varying and improving the glass compositions. A problem with this, however, is that reducing or increasing the proportion of just one component can cause a number of effects which affect the other glass components, and thus also the properties of the glass. The actions and effects of exchanging or modifying several components in a glass composition are therefore even more complex and often predictable only to a limited extent. It is therefore relatively difficult to provide glass compositions tailored to specific applications. A simple replacement of one glass component by one or more other components in order to achieve the desired physical and technical glass properties is therefore usually not possible. Instead, completely new developments or extensive changes in the glass composition are often required.

Numerous proposals for borosilicate glasses are known from the state of the art, some of which also describe their use in the pharmaceutical sector. Some known glass compositions are described in the following:

For example, JP 2014-169209 A describes a drug container made of borosilicate glass with the following glass composition in mol %:

| | |
|---|---|
| $SiO_2$ | 70-80 |
| $B_2O_3$ | 5-15 |
| $Al_2O_3$ | 3-10 |
| $Na_2O$ | 3-10 |
| $K_2O$ | 0-5 |
| CaO | 0-5 |
| BaO | 0-3 | wherein a compressive stress layer formed by ion exchange treatment is present in at least the outer surface layer of the container. Examples 1 to 5 show that the limitations according to the invention (ratio (1) and, where applicable, ratio (2)) are not fulfilled.

Further, U.S. Pat. No. 9,714,188 B2 describes alkali boroaluminum silicate glasses with high breaking strength. The glass composition comprises:

| | |
|---|---|
| $SiO_2$ | 63.2-69.2 mol % |
| $Al_2O_3$ | 8.9-12.0 mol % |

-continued

| | |
|---|---|
| $B_2O_3$ | 9.7-13.4 mol % |
| MgO | 3.0-7.1 mol % |
| $Na_2O$ | 8.8-11.8 mol %, | wherein the glass composition has a viscosity and has a value for the logarithm of the viscosity between 3 and 4 at a temperature of at least 900 to 1300° C. and the glass has a coefficient of thermal expansion $CTE_{20\text{-}300°\,C.}$ of 55 to $68 \times 10^{-7}$/° C. The tempered MgO-containing glass exhibits a Vickers hardness of 10-15 kgf. Due to its low melting and molding temperatures, this glass composition enables float-based manufacturing processes, in which the glass can be tempered by ion exchange. The limitations of the invention relating to the glass composition are not relevant here and are not disclosed.

Alkali boroaluminosilicate glasses with high breaking strength are also disclosed in U.S. Patent Application Publication No. 2015/0079400 A1 and comprise: from about 60 to about 70 mol % $SiO_2$, from about 8 to about 13 mol % $Al_2O_3$, from about 9 to about 15 mol % $B_2O_3$, from about 2 to about 8 mol % MgO, from about 8 to about 13 mol % $Na_2O$. The glasses can be tempered by ion exchange. The limitations of the invention relating to the glass composition are not relevant here and are not disclosed.

Further, U.S. Pat. No. 9,714,192 B2 discloses a glass composition of a chemically temperable glass, in which a low potassium content of the glass leads to a deeper penetration depth (higher DoL) than a glass with a higher potassium content. The alkali aluminosilicate glass comprises:

| | |
|---|---|
| $SiO_2$ | at least about 50 mol % |
| $Al_2O_3$ | about 9 to about 22 mol % |
| $B_2O_3$ | about 3 to about 10 mol % |
| $Na_2O$ | more than 14 to about 20 mol % |
| $K_2O$ | 0 to 1 mol % |

MgO+ZnO≥0.1 mol %, 0≤MgO≤6 mol %, 0≤ZnO≤6 mol %, with a compressive stress layer CS(d) which varies as a function of depth d from the surface of the glass to the layer depth DOL, wherein 1.2×CSerfc(d)≥CS(d)≥1.1×CSerfc(d) at 0.4×DOL≤d≤0.6×DOL, wherein CSerfc(d) represents a compressive stress at a depth d determined from an error function erfc.

Similarly, U.S. Patent Application Publication No. 2014/0227524 A1 describes alkali aluminum silicate glasses with a compressive stress layer CS(d) that varies as a function of depth d from the surface to a layer depth DOL, where CS(d)>CSerfc(d) at 0<d≤DOL, where CSerfc(d) represents the compressive stress at depth d determined from the error function erfc. The alkali aluminum silicate glass comprises, for example:

| | |
|---|---|
| $SiO_2$ | at least about 50 mol % |
| $Al_2O_3$ | about 9 to about 22 mol % |
| $B_2O_3$ | about 3 to about 10 mol % |
| $Na_2O$ | about 9 to about 20 mol % |
| $K_2O$ | 0 to about 5 mol % |
| MgO, ZnO or combinations | at least about 0.1 mol %, | wherein 0≤MgO≤6 mol % and 0≤ZnO≤6 mol % and, where applicable, at least one of CaO, BaO and SrO with 0 mol %≤CaO+SrO+BaO≤2 mol %.

In addition, EP 3 147 265 A1 discloses chemically resistant glasses which are used in particular as pharmaceutical primary packaging and can be chemically toughened. The glass composition (in mol % on oxide basis) is as follows:

| | |
|---|---|
| $SiO_2$ | 64-77 |
| $Al_2O_3$ | 5-14 |
| $Na_2O$ | 4-12 |
| CaO | 1-12 |
| MgO | 0-14 |
| $ZrO_2$ | 0-2 |
| $TiO_2$ | 0-4.5 | wherein the ratio $Al_2O_3/Na_2O \geq 1$, wherein the ratio $Al_2O_3/CaO \geq 1.5$, wherein the total content of $SiO_2+Al_2O_3 < 82$ mol % and wherein $B_2O_3$ is not present except for unavoidable impurities. Preferred is a processing temperature T4 of less than 1350° C. and a hydrolytic resistance according to DIN ISO 719 HGB1 and ISO 720 HGA.

In certain medical and especially pharmaceutical applications, chemically tempered glass articles, such as glass containers, of borosilicate glass play an important role. Borosilicate glasses are necessary so that the glass article has a high hydrolytic resistance. The disadvantage of borosilicate glasses known from the state of the art, however, is that they cannot be tempered as well as, for instance, aluminum silicate glasses. The use of aluminum silicate glasses in place of borosilicate glasses is, however, not possible, as aluminum silicate glasses generally provide poorer hydrolytic resistance. Another disadvantage of aluminum silicate glasses is their undesirably high release of aluminum ions into the material with which they are in contact, e.g. pharmaceutical compositions, under storage or preservation conditions. In addition, aluminum silicate glasses require much higher melting temperatures and are therefore much more expensive to manufacture.

Despite the many attempts to design the perfect borosilicate glass for pharmaceutical applications, susceptibility to chemical tempering is insufficient in prior art borosilicate glasses. On the other hand, prior art glasses with good susceptibility to chemical tempering are deficient in chemical resistance.

What is needed in the art is a way to avoid the above-mentioned disadvantages of the prior art and to provide a borosilicate glass article which has improved susceptibility to chemical tempering compared to known borosilicate glasses, whilst at the same time being usable in the medical, especially pharmaceutical, field. In particular, the borosilicate glass article should be suitable for use as a pharmaceutical primary packaging and exhibit low alkali release, particularly good hydrolytic resistance and higher strength compared to the borosilicate glasses known from the state of the art.

SUMMARY OF THE INVENTION

In some exemplary embodiments disclosed herein, a borosilicate glass article having a diffusivity D of at least 6 µm²/h and a hydrolytic resistance class I (HGA1 according to ISO720:1985 or type I according to USP660/Glass Grains) is provided. The borosilicate glass article may have a ratio $B_2O_3/Na_2O$ of less than 1.20 and/or a ratio of $B_2O_3/MgO$ in mol % of at least 1.4.

In some embodiments, diffusivity ranges from 6 µm²/h to 25 µm²/h, or from 6.3 µm²/h to 20.5 µm²/h. Some glass articles have diffusivities from 6.9 µm²/h to 14.5 µm²/h.

The glass article is chemically temperable. The expression "chemically temperable" means that the article can be chemically tempered, i.e. it is susceptible to chemical tempering. The degree of susceptibility to chemical tempering is given as diffusivity D.

In some embodiments, the glass article has a low boron content in the range of 3.0 to 10.0 mol % and a corresponding $Na_2O$ content so that the ratio (1): $B_2O_3/Na_2O$ is <1.20 based on mol %.

In some embodiments, the ratio (2): $B_2O_3/R_2O$ is <1.20, based on mol %, wherein $R_2O=\Sigma Li_2O+Na_2O+K_2O$, wherein at least one of $Li_2O$ and $K_2O$ is >0 mol %.

In some embodiments, $Li_2O$ and $K_2O$ in the glass composition are both 0 mol %.

The glass described is a borosilicate glass, i.e. it contains a considerable amount of boron oxide. Borosilicate glasses will not achieve diffusivities comparable to those of alumosilicate glasses, such as 50 $\mu m^2/h$ or even more. Instead, the glasses described herein achieve appreciably high diffusivities such as in the range of from 6 $\mu m^2/h$ to 25 $\mu m^2/h$. It was found that diffusivity values for borosilicate glass can be influenced by the cooling rate used during production, e.g. after drawing a glass tube for pharmaceutical containers. It was found that if the glass undergoes very fast cooling, diffusivity increases whereas hydrolytic, acid resistance and leaching increases. If the glass cools very slowly, diffusivity decreases, hydrolytic as well as acid resistance increase and leaching is reduced. The effective cooling result can be measured on a given glass article simply by measuring the compaction that a glass article undergoes under controlled temperature conditions, wherein higher compaction corresponds to fast cooling and lower compaction corresponds to slow cooling. Particularly, it was found that the desired diffusivity, leaching characteristics, hydrolytic and/or acid resistance values can be obtained, if glass articles are produced such that the glass exhibits a compaction of from 20 to 70 μm per 100 mm length. In some embodiments, compaction should be in a range of from 25 to 65 μm, or from 30 to 60 μm per 100 mm length.

Compaction measurement is very simple. An article or part of an article of a given length, e.g. a tube or syringe barrel, or a part thereof, is subjected to heat, wherein the article or part thereof is heated from room temperature to 500° C. by putting the article or part thereof into an oven (pre-heated to 500° C.), kept in the oven at 500° C. for 1 hour, and cooled back to room temperature by taking the article or part thereof out of the oven and letting it cool down at room temperature in ambient atmosphere. Room temperature is 20° C. The length of the article or part thereof is measured before and after heat treatment. The length is the article's diameter or the diameter of its part along its respective longitudinal axis. Glasses of the prior art achieve excellent diffusivity only with $Al_2O_3$-rich compositions. These compositions are not always sufficiently stable in terms of hydrolytic and acid resistance. Importantly, the transition metals, including Al(III), bind covalently to proteins because the protein ligands donate an electron pair to form covalent bonds with the transition metal (Zhou et al., AAPS PharmSciTech, Vol. 12, No. 1, March 2011). Biological drugs, such as antibodies, enzymes, etc. are very important drugs. The respective products are often very expensive and difficult to store for longer periods. It would be desirable to increase the shelf life of such biological drug compositions. One aspect of increasing the shelf life is to reduce the amount of Al(III) leaching into the compositions. Exemplary embodiments disclosed herein provide a glass having excellent chemical resistance, good diffusivity and a low potential to leach Al(III). The $Al_2O_3$ content in the glass may thus be less than <8.9 mol %, less than 8 mol %, less than 7.5 mol % or even less than 7 mol %. The ratio of the molar concentrations of $B_2O_3$ relative to the sum of the concentrations of $B_2O_3$ and $Al_2O_3$ may be at least 0.30, or at least 0.35 or even at least 0.40. In some embodiments, this ratio is up to 0.8, or up to 0.7.

In some embodiments, the chemically temperable article has the desired hydrolytic resistance and leaching properties irrespective of chemical tempering. While many prior art glasses show sufficient resistance only after chemical tempering, untempered articles disclosed herein already show excellent properties in this respect. However, exemplary embodiments disclosed herein also include a chemically tempered borosilicate glass article having a compressive stress CS >400 MPa (e.g. 401 MPa and greater) and a penetration depth DoL >20 μm (e.g. 21 μm and greater).

In some embodiments of the glass article, $Li_2O$ and $K_2O$ can both be 0 mol %; and ratio (2) may be inapplicable. Ratio (2) may be applicable only if, in addition to $Na_2O$, $Li_2O$ and/or $K_2O$ are >0 mol %. The glass article may be substantially free of other alkali oxides, in which case alkali oxides are not present, except as unavoidable impurities, such as in amounts of less than 100 ppm, or less than 50 ppm (n/n). Generally, when referring to the article or glass composition being free of a certain component, the respective component may be present in the glass only as an impurity and it is not intentionally added to the composition. Typically, such components will be present in amounts of less than 100 ppm, or even less than 50 ppm (n/n).

In some embodiments, a borosilicate glass article has a ratio $B_2O_3/Na_2O$ of less than 1.20 and a ratio of $B_2O_3/MgO$ in mol % of at least 1.4, further having a diffusivity of 6 $\mu m^2/h$ to 25 $\mu m^2/h$ and a hydrolytic resistance of HGA1 according to ISO720:1985. In some embodiments, the diffusivity is from 6.3 $\mu m^2/h$ to 20.5 $\mu m^2/h$.

In some embodiments, a borosilicate glass article has a compaction of from 20 to 70 μm per 100 mm article length. The article may further have a diffusivity of 6 $\mu m^2/h$ to 25 $\mu m^2/h$ and/or a hydrolytic resistance of HGA1 according to ISO720:1985.

In some embodiments, a borosilicate glass article has a ratio $B_2O_3/Na_2O$ of less than 1.20, comprising $B_2O_3$ in an amount of from 3.0 mol % to 10.0 mol %, comprising MgO in an amount of from 0 to 2.0 mol % and CaO in an amount of from 0 to 2.0 mol %. The article may further have a hydrolytic resistance of HGA1 according to ISO720:1985. The article may be chemically tempered to have a compressive stress CS>400 MPa (e.g. 401 MPa and greater) and a penetration depth DoL >20 μm (e.g. 21 μm and greater).

In some embodiments, a glass has a content of $SiO_2$ of at least 65 mol % and a content of $Al_2O_3$ of up to 8.9 mol %. In some embodiments, a content of $SiO_2$ is at least 65 mol % and a content of $Al_2O_3$ is up to 8 mol %. In some embodiments, a content of $SiO_2$ is at least 65 mol % and a content of $Al_2O_3$ is up to 7.6 mol %. In some embodiments, a content of $SiO_2$ is at least 70 mol % and a content of $Al_2O_3$ is up to 7.6 mol %. In some embodiments, a content of $SiO_2$ is at least 70 mol % and a content of $Al_2O_3$ is up to 6.5 mol %. The restrictions of the amounts of $SiO_2$ and $Al_2O_3$ address the hydrolytic, alkali and acid resistances of the glasses. It is known that a high proportion of $SiO_2$ contributes to good resistance values. Glasses with high amounts of alumina have insufficient acid resistance.

Problems may arise, if the content of $Na_2O$ exceeds the content of $Al_2O_3$ in the glass. In that case, the sodium surplus dissolves Si—O—Si oxygen bridges so that non-bridging oxygen with attached sodium ions are generated (Si—O—Na$^+$), whereas the sodium simply donates its oxygen to the aluminum, if sufficient aluminum is present. Then, a three dimensional tetrahedral will form with either Si$^{4+}$ or Al$^{3+}$ ions in the center between four oxygen atoms. Sodium will be able to move freely within said network. Hence, exemplary embodiments provided according to the invention use boron oxide so that boron can perform the structural function of the aluminum. However, the boron content may not be too high; particularly the ratio of boron to sodium, if a high chemical temperability is desired. Therefore, exemplary embodiments provided according to the invention include limitations regarding the content of boron.

It is surprising that the present invention provides highly temperable glasses, despite their low aluminum content. It is an advantage that the glasses have a low density because handling and transport are improved with low-density glasses. It is surprising that this low density does not affect the Young's modulus of the glasses. Particularly, the glasses have excellent ratios of elastic modulus to density (E/ρ) above those of the prior art. Considering that Young's modulus should be high and density should be low, an exemplary E/ρ ratio is at least 303*10$^6$ m$^2$/s$^2$. In some embodiments, the E/ρ ratio is at least 304*10$^6$ m$^2$/s$^2$, at least 305*10$^6$ m$^2$/s$^2$, at least 306*10$^6$ m$^2$/s$^2$, at least 307*10$^6$ m$^2$/s$^2$, or at least 308*10$^6$ m$^2$/s$^2$.

The density can be calculated according to Alexander Fluegel, Global Model for Calculating Room-Temperature Glass Density from the Composition, J. Am. Ceram. Soc., 90 [8]2622-2625 (2007), wherein Sb$_2$O$_3$ and optionally any other refining agent may be treated as "remainder" in accordance with this literature. The glasses may have densities of below 2.400 g/cm$^3$, below 2.390 g/cm$^3$ or even below 2.370 g/cm$^3$. If necessary, cooling conditions during production may be adjusted to achieve the desired densities. In some embodiments, the glasses have a Young's modulus of at least 70 GPa, at least 71 GPa or at least 72 GPa. In some embodiments, the Young's modulus is up to 75 GPa or up to 74 GPa.

The elastic modulus can be calculated according to A. MAKISHIMA and J. D. MACKENZIE, DIRECT CALCULATION OF YOUNG'S MODULUS OF GLASS, Journal of Non-Crystalline Solids, 12 (1973) 35-45, wherein the density values obtained according to Fluegel are used. The molar mass is calculated as the sum of the results of multiplication of the well-known molar masses of the oxides with their molar proportions. For calculation of packing density according to formula (9) in the Makishima and Mackenzie publication the content of Sb$_2$O$_3$ may be neglected in the sum of the products of the coefficients Vi and the molar proportions Xi. For the summation, the molar proportions Xi of the other components were normalized such that their sum is 1, or 100%. The summation according to formula (11) of Makishima and Mackenzie has been performed accordingly.

The disclosure of the references Fluegel, and Makishima and Mackenzie is incorporated herein by reference as if fully set forth herein.

The foregoing and the following aspects relate to each of the embodiments mentioned herein.

Thus, this invention provides a chemically temperable, and a chemically tempered borosilicate glass article with a comparably low boron content which meets the high quality requirements of the pharmaceutical sector, for example as a primary packaging material. The glass articles exhibit low alkali release as well as particularly good hydrolytic resistance, wherein the glasses belong to hydrolytic resistance class I (HGA1, according to ISO720) and/or type I according to USP660 (Glass Grains). Due to the excellent properties of the glass during chemical tempering, glass articles with excellent strength properties are obtained.

Glass articles provided according to this invention have significantly better tempering properties compared to borosilicate glasses known from the state of the art. The example embodiments demonstrate excellent chemical tempering properties of the borosilicate glasses. Chemically tempered glass articles provided according to this invention have a significantly higher strength than known borosilicate glass articles.

In an aspect, the borosilicate glasses of the invention differ from prior art borosilicate glasses in that they have low boron oxide content and particular amounts of Na$_2$O. In an aspect, the glass includes particular amounts of Li$_2$O and/or K$_2$O. This means that the glasses allow for a higher degree of chemical tempering than achieved in neutral glasses, while the glasses still have an excellent resistance. The borosilicate glasses may achieve hydrolytic resistance class I (i.e. HGA1 according to ISO720 or type I according to USP660/Glass Grains).

Chemical tempering may include ion exchange treatment of temperable glass articles. High compressive stresses and high penetration depths can be achieved. In some embodiments, the glass articles can be chemically tempered such that a compressive stress CS >400 MPa (e.g. 401 MPa and more) and/or a penetration depth DoL >20 μm (e.g. 21 μm and more) can be obtained. Tests have shown that known borosilicate glasses exhibit lower compressive stress and/or lower penetration depths DoL, under the same tempering conditions. Through chemical tempering under ion exchange of borosilicate glasses, a compressive stress CS of more than 420 MPa, more than 430 MPa, more than 440 MPa, more than 450 MPa, more than 460, more than 470 MPa, more than 480 MPa, more than 490 MPa, more than 500 MPa, more than 510 MPa, more than 520 MPa, more than 530 MPa, more than 540 MPa or even more than 550 MPa can be achieved. Compressive stress may be up to 1000 MPa, up to 800 MPa, or up to 600 MPa. A penetration depth DoL of more than 21 μm, 22 μm, 23 μm, 24 μm, 25 μm, 26 μm, 27 μm, 28 μm, 29 μm, 30 μm, 31 μm, 32 μm, 33 μm, 34 μm or even more than 36 μm can be achieved. Maximum achievable penetration depths can be up to 80 μm.

The borosilicate glass article is made of borosilicate glass. In some embodiments, the borosilicate glass has a silicon dioxide (SiO$_2$) content in the range of from 65 to 80 mol %, such as in the range of from 65 to 78.5 mol %, in the range of from 70 to 78.5 mol %, or in the range of from 72 to 78.3 mol %. It can be advantageous if the SiO$_2$ content is >70.0 mol % (e.g. 70.1 mol % and more) or >72.0 mol % (e.g. 72.1 mol % and more).

The content of boron oxide (B$_2$O$_3$) may be in the range of from 3.0 to 10.0 mol %, such as in the range of from 3.6 to 9.4 mol %, or in the range of from 4.0 to 8.5 mol %. If the content of boron oxide is too low, the hydrolytic resistance may be affected. If the boron oxide content is too high, the glasses' susceptibility to chemical tempering may be impaired. Higher boron oxide contents worsen the penetration depth (DoL) and the tempering (CS) is only slightly increased. Only after a longer time in the tempering bath can a comparable tempering (DoL) be achieved, i.e. the glass has reduced diffusivity D. If the boron oxide content is too high, the diffusivity becomes very low and acceptable tempering stresses and penetration depths are not achievable. Thus, the glass may contain from 3.0 to 10.0 mol %, such as from 3.6 to 9.4 mol % or from 4.0 to 8.5 mol % B$_2$O$_3$.

In the glass composition, the content of sodium oxide (Na$_2$O) may be in the range of from 6.7 to 13.0 mol %, such as in the range of from 7.3 to 12.5 mol %, in the range of from 8.0 to 12.0 mol %, or from 8.5 to 11.5 mol %. If the content of sodium oxide is too low, diffusivity may be impaired, since the ion exchange capability may be restricted and the tempering values (CS and/or DoL) may become very low. If the content of sodium oxide is too high, it is possible that due to alkali leaching the hydrolytic resistance class I (HGA1, according to ISO720 and/or type I according to USP660/Glass Grains) is no longer achieved.

In the glass article, a ratio of B$_2$O$_3$/MgO in mol % may be at least 1.4, or at least 2.6. In some embodiments, this ratio may be limited to less than 10.0 or less than 9.0. Keeping the compositional ranges of the glass in that range contributes to excellent chemical resistance with good diffusivity.

A high sodium oxide content in a borosilicate glass results in a high coefficient of thermal expansion (CTE), with the consequence of lower thermal shock resistance, which can lead to glass defects in the product, also during further processing. It is therefore advisable that the concentration of sodium oxide in the borosilicate glass is <14 mol %. The glasses may contain from 6.7 to 13.0 mol %, from 7.3 to 12.5 mol %, from 8.0 to 12.0 mol % or from 8.5 to 11.5 mol % Na$_2$O.

The ratio B$_2$O$_3$/Na$_2$O for the borosilicate glasses may be less than 1.20. This ratio B$_2$O$_3$/Na$_2$O for state-of-the-art borosilicate glasses is usually >1.20. It was found that this ratio contributes to the excellent diffusivity of the glass articles. If this limitation is not fulfilled, some glasses can no longer be tempered sufficiently, and the compressive stress and penetration depth may no longer have satisfactory values. This is also shown in the comparative examples (see Table 2, V1 and V2 further herein), where the ratio is >1.20 and the borosilicate glasses can generally no longer be tempered well, i.e. diffusivity is low. The ratio B$_2$O$_3$/Na$_2$O for the borosilicate glasses may be at least 0.10, at least 0.20, at least 0.30 or at least 0.40.

In a borosilicate glass composition provided according to this invention, the content of aluminum oxide (Al$_2$O$_3$) may be in the range of from 3.0 to 8.0 mol %, such as in the range of from 3.0 to 7.99 mol %, from 3.1 to 7.6 mol %, from 3.2 to 7.6 mol %, or in the range of from 3.3 to 6.5 mol %. If the aluminum oxide content is too low, the ion exchange capability can be restricted and the tempering values (CS, DoL) can therefore become very low. If the aluminum oxide content is too high, the glass may be difficult to melt, a higher energy input may be necessary, and shaping may be difficult (increased processing temperature VA). Also, the risk of Al(III) leaching may rise. It is therefore regarded as advantageous if the borosilicate glasses has from 3.0 to 8.0 mol %, from 3.0 to 7.99 mol %, from 3.1 to 7.6 mol %, from 3.2 to 7.6 mol %, or from 3.3 to 6.5 mol % Al$_2$O$_3$. It was found that it can be useful, in a borosilicate glass, if the concentration of aluminum oxide is <8.0 mol %, or <7.5 mol %, or <7.0 mol %.

In some embodiments, the content of lithium oxide (Li$_2$O) in the borosilicate glass is in the range of from 0 to 2.5 mol %, in the range of from 0 to 2.1 mol %, in the range of from 0 to 1.8 mol % or in the range of from 0 to 1.2 mol %, in particular in the range of from 0 to 1.1 mol %. Excessive lithium oxide contents can lead to increased alkali leaching, so that hydrolytic resistance class I (HGA1, according to ISO720) or type I according to USP660 (Glass Grains) may no longer be achieved. Lithium oxide is an expensive raw material and therefore a lower content is better from an economic point of view. Also, a high lithium content increases the coefficient of thermal expansion (CTE), resulting in lower thermal shock resistance, which can lead to glass defects in the product, also during further processing. In some embodiments of the borosilicate glass, excellent tempering can be achieved with up to 1.1 mol % Li$_2$O.

In some embodiments, the glass of the glass article has a coefficient of thermal expansion (CTE$_{20\ to\ 300°\ C.}$) of from 5.1 to 7.3*10$^{-6}$/K, such as from 6.0 to 7.3*10$^{-6}$/K. It was found that CTEs within the range provide for excellent thermal shock resistance.

Experiments have shown that the penetration depth (DoL) decreases with increasing Li$_2$O content for the same processing times; at very high Li$_2$O contents, the CS value also decreases. However, both Tg and VA decrease with increasing Li$_2$O content, so that an addition of Li$_2$O can also lead to an advantage in terms of melting (less energy for production/melting of the glass). It is therefore regarded as advantageous if the glasses contain from 0 to 2.5 mol %, such as from 0 to 2.1 mol %, from 0 to 1.8 mol %, from 0 to 1.2 mol % or from 0 to 1.1 mol % of Li$_2$O. In some embodiments, the glass comprises lithium oxide in amounts of at least 0.1 mol % or at least 0.3 mol %.

A potassium oxide (K$_2$O) content in an exemplary borosilicate glass is in the range of from 0 to 2.0 mol %, in the range of from 0 to 1.8 mol %, in the range of from 0 to 1.5 mol %, or in the range of from 0 to 1.0 mol %. In some cases, the glass may also contain K$_2$O in the range of from 0 to 0.8 mol %. Low potassium oxide contents improve the devitrification tendency of the glass and at the same time the alkali leaching is lower, so that the glasses may fall into hydrolytic resistance class I (HGA1, according to ISO720) or type I according to USP660 (Glass Grains). High contents of potassium oxide in the glass increase the coefficient of thermal expansion (CTE), resulting in lower thermal shock resistance, which can lead to glass defects in the product, also during further processing. If the potassium oxide content is too high, hydrolytic resistance may be impaired. High contents of potassium oxide can also interfere with the ion exchange capability of the glass and reduce diffusivity and/or the penetration depth (DoL) of the K$_2$O in the chemical tempering bath. It is therefore regarded as advantageous if the borosilicate glasses contains from 0 to 2.0 mol %, such as from 0 to 1.8 mol %, from 0 to 1.5 mol %, from 0 to 1.0 mol % or from 0 to 0.8 mol % of K$_2$O.

The borosilicate glass composition may have a content of magnesium oxide (MgO) in the range of from 0 to 3.2 mol %, from 0 to 2.0 mol %, from 0 to 1.5 mol %, or in the range of from 0 to 1.0 mol %. Other exemplary ranges may include from 0.5 to 1.5 mol %, from 0.5 to 1.0 mol % or from 0 to 0.5 mol %. Exemplary contents of magnesium oxide are <2.0 mol % (e.g. 1.99 mol %-0 mol %). Magnesium oxide is an alkaline earth oxide and serves to adjust the viscosity of the glass. It lowers the melting point of the glass and helps the glass to melt better. Too high a magnesium content in the glass worsens the devitrification and at the same time increases the ion exchange capability (CS in MPa) of the glass. It is therefore considered to be advantageous if the borosilicate glasses contain MgO in amounts of from 0 to 3.2 mol %, from 0 to 2.0 mol % or <2.0 mol % (e.g. 1.99 mol %-0 mol %). In some embodiments, the MgO amount is from 0 to 1.5 mol %, or from 0 to 1.0 mol %. In some embodiments the amount of MgO may be from 0.5 to 1.5 mol % or from 0.5 to 1.0 mol % or from 0 to 0.5 mol %.

In the borosilicate glass composition, the content of calcium oxide (CaO) may be in the range of from 0 to 2.5 mol %, in the range of from 0 to 2.1 mol %, from 0 to 2.0 mol %, from 0 to 1.5 mol %, or in the range of from 0 to 1.0 mol %. Other exemplary ranges may be from 0.5 to 2.5 mol % or from 0.5 to 2.1 mol % or from 0.5 to 2.0 mol % or from 0.5 to 1.5 mol % or from 0.5 to 1.0 mol % or from 0 to 0.5 mol % CaO. Calcium oxide is an alkaline earth oxide and serves to adjust the viscosity of the glass (optimization of the melting behavior). Low contents of calcium oxide lower the melting point of the glass so that it can be melted with less energy. Too high a calcium oxide content may worsen the ion exchange capacity/diffusivity of the glass to such an extent that the DoL value decreases. In addition, the ion exchange capacity of the exchange bath may be impaired, i.e. the ion exchange bath must be changed more frequently. It is therefore regarded as advantageous, if the borosilicate glasses contain from 0 to 2.5 mol %, from 0 to 2.1 mol %, from 0 to 2.0 mol %, from 0 to 1.5 mol %, or from 0 to 1.0 mol % CaO. In some embodiments the amount of CaO is from 0.5 to 2.5 mol % or from 0.5 to 2.1 mol % or from 0.5 to 2.0 mol % or from 0.5 to 1.5 mol % or from 0.5 to 1.0 mol % or from 0 to 0.5 mol %.

The borosilicate glass may contain one or more refining agents for removing bubbles from the melt in a range of from 0.01-2.0 mol %, such as from 0.01-1.8 mol %. The quantities used vary, depending on the quantity and type of refining agent used and the glass composition to be refined. Refining agents may include fluorides such as $Na_2SiF_6$, halides, especially chlorides such as NaCl, sulfates such as $Na_2SO_4$, arsenic trioxide, antimony oxide, cerium oxide and the like. It may be advisable not to use antimony and arsenic, which is particularly advantageous for use as pharmaceutical primary packaging.

In some embodiments, the borosilicate glass is fluoride-free (0 mol % F) with the exception of unavoidable impurities, since fluoride can have a negative effect on the chemical tempering.

In addition to the glass components described, the glass may contain other components, which may be present in the customary quantities. In some embodiments, the components discussed herein constitute at least 95 mol %, at least 98 mol % or at least 99 mol % of the glass composition. In some embodiments, the following components are not present: barium oxide (BaO) and/or strontium oxide (SrO) and/or tin oxide ($SnO_2$).

In some embodiments, a chemically temperable or tempered borosilicate glass article comprises the following glass composition (in mol % on oxide basis):

| | |
|---|---|
| $SiO_2$ | 65.0-80.0 |
| $B_2O_3$ | 3.0-10.0 |
| $Al_2O_3$ | 3.0-8.0 |
| $Li_2O$ | 0-2.5 |
| $Na_2O$ | 6.7-13.0 |
| $K_2O$ | 0-2.0 |
| MgO | 0-3.2 |
| CaO | 0-2.5 |
| optionally one or more refining agents | 0.01-2.0, | wherein
if $Li_2O$ and $K_2O$ in the glass composition are both 0 mol %, the ratio $B_2O_3/Na_2O$ is <1.20, based on mol %, and
if at least one of $Li_2O$ and $K_2O$ is >0 mol %, the ratio $B_2O_3/R_2O$ is <1.20, based on mol %, wherein $R_2O=\Sigma Li_2O+Na_2O+K_2O$.

In the chemically tempered borosilicate glass article a compressive stress CS>400 MPa (e.g. 401 MPa and greater) and a penetration depth DoL >20 μm (e.g. 21 μm and greater) may be present.

In some embodiments, a chemically temperable or tempered borosilicate glass article comprises the following glass composition (in mol % on oxide basis):

| | |
|---|---|
| $SiO_2$ | 65-78.5 |
| $B_2O_3$ | 3.6-9.4 |
| $Al_2O_3$ | 3.1-7.6 |
| $Li_2O$ | 0-2.1 |
| $Na_2O$ | 7.3-12.5 |
| $K_2O$ | 0-1.8 |
| MgO | 0-2.0 |
| CaO | 0-2.1 |
| optionally one or more refining agents | 0.01-2.0, | and optionally wherein
if $Li_2O$ and $K_2O$ in the glass composition are both 0 mol %, the ratio $B_2O_3/Na_2O$ is <1.20, based on mol %, and
if at least one of $Li_2O$ and $K_2O$ is >0 mol %, the ratio $B_2O_3/R_2O$ is <1.20, based on mol %, wherein $R_2O=\Sigma Li_2O+Na_2O+K_2O$.

In the chemically tempered borosilicate glass article a compressive stress CS>400 MPa (e.g. 401 MPa and greater) and a penetration depth DoL >20 μm (e.g. 21 μm and greater) may be present.

In some embodiments, a chemically temperable or tempered borosilicate glass article comprises the following glass composition (in mol % on oxide basis):

| | |
|---|---|
| $SiO_2$ | 70-78.5 |
| $B_2O_3$ | 4.0-8.5 |
| $Al_2O_3$ | 3.2-7.6 |
| $Li_2O$ | 0-1.8 |
| $Na_2O$ | 8.0-12.0 |
| $K_2O$ | 0-1.5 |
| MgO | 0-1.5 |
| CaO | 0-1.5 |
| optionally one or more refining agents | 0.01-2.0, | and optionally wherein
if $Li_2O$ and $K_2O$ in the glass composition are both 0 mol %, the ratio $B_2O_3/Na_2O$ is <1.20, based on mol %, and
if at least one of $Li_2O$ and $K_2O$ is >0 mol %, the ratio $B_2O_3/R_2O$ is <1.20, based on mol %, wherein $R_2O=\Sigma Li_2O+Na_2O+K_2O$.

In the chemically tempered borosilicate glass article a compressive stress CS>400 MPa (e.g. 401 MPa and greater) and a penetration depth DoL >20 μm (e.g. 21 μm and greater) may be present.

In some embodiments, a chemically temperable or tempered borosilicate glass article comprises the following glass composition (in mol % on oxide basis):

| | |
|---|---|
| $SiO_2$ | 72-78.3 |
| $B_2O_3$ | 4.0-8.5 |
| $Al_2O_3$ | 3.3-6.5 |
| $Li_2O$ | 0-1.1 |
| $Na_2O$ | 8.5-11.5 |
| $K_2O$ | 0-1.0 |
| MgO | 0-1.0 |
| CaO | 0-1.0 |
| optionally one or more refining agents | 0.01-2.0, | and optionally wherein
if $Li_2O$ and $K_2O$ in the glass composition are both 0 mol %, the ratio $B_2O_3/Na_2O$ is <1.20, based on mol %, and
if at least one of $Li_2O$ and $K_2O$ is >0 mol %, the ratio $B_2O_3/R_2O$ is <1.20, based on mol %, wherein $R_2O=\Sigma Li_2O+Na_2O+K_2O$.

In the chemically tempered borosilicate glass article a compressive stress CS>400 MPa (e.g. 401 MPa and greater) and a penetration depth DoL >20 μm (e.g. 21 μm and greater) may be present.

The invention also relates to borosilicate glasses as such with the limitations described above as well as the various embodiments for the respective glass components or glass composition variants. Borosilicate glasses may comprise or consist of the specified glass components or glass compositions in the stated amounts.

In some embodiments, in the borosilicate glass article and thus also in the borosilicate glass the ratio (1): $B_2O_3/Na_2O$ can be <1.18, based on mol %, or the ratio (1): $B_2O_3/Na_2O$ can be <1.00, based on mol %. In some embodiments, in the borosilicate glass article and thus also in the borosilicate glass the ratio (2): $B_2O_3/R_2O$ can be <1.18, based on mol %, or the ratio (2): $B_2O_3/R_2O$ can be <1.00, based on mol %.

Many processes for the production of borosilicate glasses are known to the person skilled in the art from the state of the art. In some embodiments, a customary state-of-the-art manufacturing process can be used. Since the quality of the glass article may be determined not only by the chosen glass composition and the intended use but also by the manufacturing process used for the glass article, it is advisable to select a suitable manufacturing process.

It is known that glasses with a tendency to crystallize cannot be produced in a drawing process because they crystallize too quickly for such drawing processes. In some embodiments, crystallization rate of the glass does not exceed a limit of 0.1 μm/min in a temperature range limited by the liquidus temperature and the temperature at which the viscosity of the glass is $10^{6.5-7}$ dPa·s. The liquidus temperature is the temperature above which a material is completely melted. In practice, it is the lowest temperature at which crystals are no longer observed.

The borosilicate glasses described herein may be low-crystallization borosilicate glasses that can be produced easily using known drawing processes. The term "low crystallization" borosilicate glass means that a borosilicate glass is produced with a low tendency to crystallize. The tendency to crystallize can be determined, for example, by the magnitude of the crystallization rate [in μm/min]. The low-crystallization borosilicate glasses may have a maximum crystallization rate (KGmax) of ≤0.05 μm/min (measured in a crystallization range of 700-1115° C. and a temperature T(KGmax) of ≤1000° C.). This applies for a measuring time of 1 h. The lower the crystallization rate, the greater the maximum wall thickness of the glass article that can be produced (e.g. glass tubes, rods, sheets, plates, blocks, etc.).

The crystallization rate is determined, for example, by the gradient method. For this purpose, granulate samples (0.5-1.0 mm) of the glass concerned are heat-treated in a gradient furnace according to ASTM C 829-81 (Reapproved 2010). The longest crystals are then measured microscopically. The crystal growth rate in μm/min is then calculated as the quotient of the crystal size and the tempering time.

The borosilicate glass of some embodiments of the invention can therefore easily be produced by, for example, the Vello drawing process. As already mentioned, experience has shown that the devitrification limit for the Vello process lies at a crystallization rate for the devitrification crystals of at most KGmax=0.1 μm/min. At higher values, the glass can only be produced to a limited extent using the Vello drawing process. An exemplary borosilicate glass exhibits crystallization rates KGmax of ≤0.05 μm/min. The lower the crystallization rate, the greater the maximum wall thicknesses of the glass articles that can be produced. This can be advantageous for certain applications.

The borosilicate glass can, for example, be produced using the Danner process. In this case, it is recommended that the crystallization rate should not be greater than about 0.05 μm/min.

Exemplary embodiments provided according to the invention include a method of making a glass article according to the invention, including
 drawing a glass melt to form a glass article or a precursor thereof
 cooling the article or precursor thereof.

The method may further include chemically tempering the article to obtain desired CS and DoL values, such as those described herein. Cooling may include cooling the article or precursor to obtain a predetermined compaction as described before.

The raw materials that are suitable for the glass composition and the process conditions for the production of the borosilicate glass, such as for example the atmosphere in the melting furnace, the melting time and the melting temperature, etc., are known parameters and can, in the state of the art, be easily selected and adjusted by the person skilled in the art. In some embodiments, cooling of the glass articles after drawing is controlled to achieve the desired cooling-dependent parameters described above.

The glass article provided according to the invention can be in any form. The glass article provided according to the invention can be, for example, a glass container, a glass sheet, a glass plate, a glass rod, a glass tube, a glass block or another article that is useful in, for example, the pharmaceutical or medical field.

The invention also relates to pharmaceutical primary packaging comprising the borosilicate glass used in accordance with the invention, in particular those comprising a borosilicate glass composition provided in accordance with the invention. The pharmaceutical primary packaging may be selected from bottles, for example large or small bottles, such as injection bottles or vials, ampoules, cartridges, bottles, flasks, phials, beakers or syringes.

The term "pharmaceutical primary packaging" is to be understood as packaging made of glass that comes into direct contact with a medicament. The packaging protects the medicament from environmental influences and maintains the medicament according to its specification until it is used by the patient.

The glass articles in the form of glass containers can be used as pharmaceutical primary packaging. The glass article may be in contact with liquid contents such as active ingredient solutions, solvents, e.g. buffer systems, or the like, which have a pH in range from 1 to 11, in the pH range from 4 to 9, or in the pH range from 5 to 7. The articles show particularly good chemical resistance and are therefore particularly suitable for storage or preservation of these contents. A particularly good chemical resistance in the context of the present invention means that the glasses meet the requirements for storage and preservation of liquid contents applicable to the pharmaceutical sector to a high degree, in particular that the glasses have a hydrolytic resistance corresponding to hydrolytic class 1 according to ISO 720 or USP660. Al(III) leaching is effectively avoided with the articles provided according to this invention.

The glasses provided according to the invention are suitable for the manufacture of pharmaceutical containers which are in contact with their contents and can therefore be provided for the storage and preservation of those contents.

Contents that may be used are, for example, all solid and liquid compositions used in the pharmaceutical field.

Examples of contents are, without limitation: a liquid pharmaceutical preparation, a solution comprising one or more active ingredients and optionally excipients and additives, buffer systems of all kinds. Exemplary buffers include sodium bicarbonate buffer, such as a 1 molar sodium bicarbonate solution (NaHCO$_3$) 8.4% with a pH in the range of 7.0 to 8.5; citrate buffer, such as 10 mmol citrate buffer pH=6 with 150 mmol NaCl and 0.005% Tween 20; phosphate buffer, such as 10 mmol phosphate buffer, pH=7.0, with 150 mmol NaCl and 0.005% Tween 20, or water for injection, such as e.g. Sartorius ultrapure water, flushed through a 0.2 μm filter and with a resistivity of 18.2 MΩ×cm (corresponding to a conductivity of 0.055 μS/cm). Other possible contents are familiar to the person skilled in the art.

The properties of the borosilicate glass article or the borosilicate glass make it very suitable for the widest variety of applications, such as e.g. use as pharmaceutical primary packaging such as cartridges, syringes, ampoules or vials, since the substances stored in the containers, in particular aqueous solutions, do not attack the glass to any appreciable extent.

The present invention therefore also relates to the use of the borosilicate glass article as a pharmaceutical primary packaging for the accommodation and preservation of liquid or solid contents. The liquid contents may have a pH value in the range of 1 to 11, in the range of 4 to 9, or in the range of 5 to 7, wherein the liquid contents may be selected from active ingredient solutions, buffer solutions or water for injection, and combinations thereof.

The invention also relates to a pharmaceutical combination comprising the pharmaceutical primary packaging with liquid contents having a pH in the range of 1 to 11, in the range of 4 to 9, or in the range of 5 to 7, wherein the liquid contents may be selected from an active ingredient solution, buffer solution or water for injection, and combinations thereof.

The invention also relates to a pharmaceutical product, including the glass article provided according to the invention, and a drug formulation. The drug formulation may contain a biological drug, such as an antibody, enzyme, protein, peptide or the like, and one or more pharmaceutically acceptable excipients.

The borosilicate glass article provided in accordance with the invention may also be an intermediate product in the manufacture of another glass article, such as tubular glass in the form of semi-finished products, for example for further processing into pharmaceutical primary packaging.

DETAILED DESCRIPTION OF THE INVENTION

Exemplary embodiments provided according to the present invention are described in greater detail with reference to example embodiments and comparative examples, which illustrate the teaching of the invention but are not intended to restrict it.

EXAMPLES 16 different borosilicate glasses (glass compositions A1 to A16) were produced, the compositions of each of which have the following properties:

the borosilicate glasses are chemically temperable;
the diffusivity is at least 6 μm$^2$/h,
the ratio (1): B$_2$O$_3$/Na$_2$O <1.20 [mol %]; and
the glasses have excellent hydrolytic resistance.

The detailed borosilicate glass compositions with the individual components and the various properties based on the calculated and measured parameters are summarized in the following Tables 1 and 2:

TABLE 1

|  | A1 | A2 | A3 | A4 | A5 | A6 | A7 | A8 |
|---|---|---|---|---|---|---|---|---|
| SiO$_2$ | 78.0 | 75.8 | 76.0 | 76.7 | 76.8 | 73.9 | 75.4 | 77.6 |
| B$_2$O$_3$ | 5.1 | 5.1 | 4.3 | 6.9 | 6.8 | 7.0 | 6.9 | 6.9 |
| Al$_2$O$_3$ | 4.2 | 4.9 | 6.1 | 4.2 | 3.7 | 4.9 | 3.6 | 3.7 |
| Li$_2$O |  | 0.8 | 1.0 |  |  | 0.8 | 0.8 |  |
| Na$_2$O | 10.3 | 10.9 | 10.0 | 9.8 | 8.8 | 10.9 | 10.8 | 8.9 |
| K$_2$O |  | 0.3 | 0.6 |  | 0.7 | 0.3 | 0.3 | 0.7 |
| MgO |  | 0.8 | 0.8 |  | 0.8 | 0.8 | 0.8 | 0.8 |
| CaO | 0.8 | 0.8 | 0.8 | 0.8 | 0.8 | 0.8 | 0.8 | 0.8 |
| Cl | 0.5 | 0.6 | 0.4 | 0.5 | 0.5 | 0.6 | 0.6 | 0.5 |
| F$^-$ | 1.1 |  |  | 1.1 | 1.1 |  |  |  |
| BaO |  |  |  |  |  |  |  |  |
| Sb$_2$O$_3$ |  |  |  |  |  |  |  | 0.1 |
| TOTAL | 100 | 100 | 100 | 100 | 100 | 100 | 100 | 100 |
| B$_2$O$_3$/Na$_2$O < 1.2 | 0.50 | 0.47 | 0.43 | 0.70 | 0.77 | 0.64 | 0.64 | 0.78 |
| B$_2$O$_3$/R$_2$O < 1.2 | 0.50 | 0.43 | 0.37 | 0.70 | 0.72 | 0.58 | 0.58 | 0.72 |
| R$_2$O = Σ (Na$_2$O + K$_2$O + Li$_2$O) |  |  |  |  |  |  |  |  |
| B$_2$O$_3$/MgO |  | 6.4 | 5.4 |  | 8.5 | 8.8 | 8.6 | 8.6 |
| B$_2$O$_3$/(B$_2$O$_3$ + Al$_2$O$_3$) | 0.55 | 0.51 | 0.41 | 0.6 | 0.65 | 0.59 | 0.66 | 0.65 |
| CTE [10$^{-6}$/K] | 6.4 | 7.2 | 7.1 | 6.2 | 6.1 | 7.2 | 7.1 | 6.0 |
| Tg [° C.] | 512 | 535 | 540 | 510 | 505 | 530 | 525 | 540 |
| VA [° C.] | 1140 | 1110 | 1170 | 1120 | 1140 | 1070 | 1050 | 1150 |
| USP660 Glass Grains (Titration)* [ml] |  | 0.089 | 0.078 |  |  | 0.084 | 0.074 |  |
| Limit Type 1 (according to USP 660)** |  | 89% | 78% |  |  | 84% | 74% |  |
| HGA Class (according to ISO 720) | 1 | 1 | 1 | 1 | 1 | 1 | 1 | 1 |
| CS [MPa] at 450° C./9 h | 438 | 505 | 533 | 453 | 429 | 531 | 510 | 467 |
| DOL [μm] at 450° C./9 h | 24 | 27 | 32 | 22 | 22 | 22 | 21 | 23 |
| D [μm$^2$/h] at 450° C. | 8.2 | 10.3 | 14.5 | 6.9 | 6.9 | 6.9 | 6.3 | 7.5 |

TABLE 1-continued

|  | A1 | A2 | A3 | A4 | A5 | A6 | A7 | A8 |
|---|---|---|---|---|---|---|---|---|
| Density ρ [g/cm$^3$] | 2.351 | 2.376 | 2.372 | 2.352 | 2.352 | 2.384 | 2.380 | 2.356 |
| Young's modulus E [Gpa] | 70.977 | 71.488 | 72.066 | 71.937 | 71.706 | 72.444 | 71.483 | 71.135 |
| E/ρ [*10$^6$m$^2$s$^2$] | 301.896 | 300.852 | 303.763 | 305.803 | 304.811 | 3030.889 | 300.343 | 301.990 |

*Consumption of 0.02N HCl per g of glass grains in [ml].
**the specified percentages indicate the extent to which the value corresponds to the Limit of 0.10.

In this description "CTE" is the coefficient of thermal expansion at 20 to 300° C., "Tg" is the glass transition temperature, "VA" is the processing temperature in ° C. (the temperature at a glass viscosity of 10$^4$ dPa s).

TABLE 2

|  | A9 | A10 | A11 | A12 | A13 | A14 | A15 | A16 |
|---|---|---|---|---|---|---|---|---|
| SiO$_2$ | 73.1 | 76.7 | 74.3 | 76.7 | 76.85 | 73.3 | 74.8 | 75.0 |
| B$_2$O$_3$ | 7.1 | 4.3 | 4.2 | 4.2 | 4.4 | 4.3 | 4.4 | 4.4 |
| Al$_2$O$_3$ | 6.2 | 6.2 | 6.2 | 6.1 | 6.2 | 6.4 | 6.1 | 6.2 |
| Li$_2$O | 1.0 |  | 1.0 | 1.1 | 1.0 | 1.1 | 2.0 | 1.0 |
| Na$_2$O | 10.0 | 10.0 | 10.0 | 9.9 | 10.1 | 10.0 | 10.1 | 10.0 |
| K$_2$O | 0.6 | 0.6 | 0.6 | 0.0 | 0.6 | 0.6 | 0.6 | 1.3 |
| MgO | 0.8 | 0.8 | 1.6 | 0.8 | 0.0 | 3.0 | 0.7 | 0.8 |
| CaO | 0.8 | 0.8 | 1.6 | 0.8 | 0.0 | 0.8 | 0.8 | 0.8 |
| Cl | 0.4 | 0.6 | 0.5 | 0.4 | 0.35 | 0.5 | 0.5 | 0.5 |
| F$^-$ |  |  |  |  |  |  |  |  |
| BaO |  |  |  |  | 0.5 |  |  |  |
| SB$_2$O$_3$ |  |  |  |  |  |  |  |  |
| TOTAL | 100 | 100 | 100 | 100 | 100 | 100 | 100 | 100 |
| B$_2$O$_3$/Na$_2$O < 1.2 | 0.71 | 0.43 | 0.42 | 0.42 | 0.44 | 0.43 | 0.44 | 0.44 |
| B$_2$O$_3$/R$_2$O <1.2 | 0.61 | 0.41 | 0.36 | 0.38 | 0.38 | 0.37 | 0.35 | 0.36 |
| R$_2$O = Σ (Na$_2$O + K$_2$O + Li$_2$O) |  |  |  |  |  |  |  |  |
| B$_2$O$_3$/MgO | 8.9 | 5.4 | 2.6 | 5.3 |  | 1.4 | 6.3 | 5.5 |
| B$_2$O$_3$/(B$_2$O$_3$+ Al$_2$O$_3$) | 0.53 | 0.41 | 0.41 | 0.41 | 0.42 | 0.40 | 0.42 | 0.42 |
| CTE [10$^{-6}$/K] | 7.1 | 6.8 | 7.0 | 6.7 | 5.1 | 7.1 | 7.3 | 7.3 |
| Tg [° C.] | 535 | 560 | 540 | 545 | 510 | 540 | 520 | 540 |
| VA [° C.] | 1110 | 1210 | 1210 | 1190 | 1225 | 1220 | 1130 | 1160 |
| USP660 Glass Grains (Titration)* [ml] | 0.063 | 0.067 | 0.084 | 0.068 | 0.053 | 0.076 | 0.086 | 0.077 |
| Limit Type 1 (according to USP 660)** | 63% | 67% | 84% | 68% | 53% | 76% | 86% | 77% |
| HGA Class (according to ISO 720) | 1 | 1 | 1 | 1 | 1 | 1 | 1 | 1 |
| CS [MPa] at 450° C./9 h | 544 | 534 | 560 | 530 | 488 | 554 | 513 | 487 |
| DOL [μm] at 450° C./9 h | 25 | 38 | 28 | 29 | 31 | 30 | 34 | 26 |
| D [μm$^2$/h] at 450° C. | 8.9 | 20.5 | 11.1 | 11.9 | 13.6 | 12.8 | 16.4 | 9.6 |
| Density ρ [g/cm$^3$] | 2.381 | 2.363 | 2.389 | 2.365 | 2.359 | 2.391 | 2.381 | 2.380 |
| Young's modulus E [GPa] | 73.465 | 71.685 | 72.579 | 72.224 | 71.806 | 73.123 | 72.552 | 72.017 |
| E/ρ [*10$^6$m$^2$s$^2$] | 308.515 | 303.399 | 303.775 | 305.394 | 304.338 | 305.845 | 304.733 | 302.580 |

*Consumption of 0.02N HCl per g of glass grains in [ml].
**the specified percentages indicate the extent to which the value corresponds to the limit of 0.10.

In the glass compositions for all example embodiments A1 to A16 the ratio B$_2$O$_3$/Na$_2$O [in mol %] is less than 1.20. These borosilicate glasses not only show excellent properties but can also be tempered well, i.e. good values are achieved both for compressive stress (CS) and penetration depth (DoL).

In addition, borosilicate glasses were produced as comparative examples, in which the ratio (1) B$_2$O$_3$/Na$_2$O for the glass compositions V1 and V2 [in mol %] is greater than 1.20 and the ratio (2) B$_2$O$_3$/R$_2$O for the glass compositions V1 and V2 [in mol %] is greater than 1.20.

The detailed borosilicate glass compositions V1 and V2 with the individual components and the various properties based on the calculated and measured parameters are summarized in the following Table 3.

TABLE 3

| Oxide [mol %] | V1 | V2 |
|---|---|---|
| SiO$_2$ | 78.3 | 76.9 |
| B$_2$O$_3$ | 9.3 | 9.2 |
| Al$_2$O$_3$ | 3.3 | 4.4 |
| Li$_2$O |  |  |
| Na$_2$O | 7.2 | 6.2 |
| K$_2$O |  | 1.4 |
| MgO |  |  |
| CaO | 1.6 | 1.1 |
| Cl |  | 0.2 |
| F— | 0.3 |  |
| BaO |  | 0.6 |
| TOTAL | 100.0 | 100.0 |
| B$_2$O$_3$/Na$_2$O > 1.20 | 1.29 | 1.48 |
| B$_2$O$_3$/R$_2$O > 1.20 | 1.29 | 1.21 |

TABLE 3-continued

| Oxide [mol %] | V1 | V2 |
|---|---|---|
| $R_2O = \Sigma$ (Na$_2$O, K$_2$O, Li$_2$O) | | |
| CTE [$10^{-6}$/K] | 5 | 5 |
| Tg [° C.] | 565 | 567 |
| VA [° C.] | 1165 | 1182 |
| USP660 Glass Grains (Titration) [ml] | 0.055 | |
| Limit Type 1 (according to USP 660) | 55% | |
| HGA Class (according to ISO 720) | 1 | |
| CS [MPa] at 450° C./9 h | 362 | |
| DOL [μm] at 450° C./9 h | 16 | |
| D [μm2/h] | 3.6 | <6.0 |

The ratio (1): B$_2$O$_3$/Na$_2$O at 1.29 lies outside the claimed range for example V1.

In the borosilicate glass composition V2, the Na$_2$O content of 6.2 mol % is not within the previously described glass composition range; in addition, the ratio (1): B$_2$O$_3$/Na$_2$O of 1.48 is outside the previously described range.

The ratio (1) B$_2$O$_3$/Na$_2$O and also the ratio (2) B$_2$O$_3$/R$_2$O in the comparative examples V1 and V2 is therefore >1.20 as in the typical state-of-the-art borosilicate glasses, so that the limitations provided according to the invention for ratio (1) and (2) are not satisfied. Particularly since the ratio (1) B$_2$O$_3$/Na$_2$O and also the ratio (2) B$_2$O$_3$/R$_2$O in the comparative examples is >1.20, these glasses could indeed not be tempered as well as the glasses provided according to the invention set out in Tables 1 and 2.

The example embodiments (A1-A16) in Tables 1 and 2 show significantly better tempering behavior/diffusivity with the same tempering parameters relative to the comparative examples (Table 3). In the comparative examples, only a low or rather low chemical tempering can be achieved, especially with regard to the penetration depth DoL compared to the example embodiments. Nevertheless, the comparative examples show a hydrolytic class HGA1, although its strength is considerably lower than that of borosilicate glass provided in accordance with the invention that has been well tempered. The comparative examples do not satisfy the necessary ratio B$_2$O$_3$/Na$_2$O <1.2, so that the good tempering values of CS >400 MPa and at the same time DoL >20 μm could not be achieved.

Thus, according to the invention, a glass article made of borosilicate glass is provided, such as a pharmaceutical primary packaging material. The glass article has an increased strength compared to prior art borosilicate glass articles, since better chemical tempering is possible.

The following table lists example glasses disclosed in U.S. Patent Application Publication No. 2015/0152003 including their densities, Young's modulus and ratio E/ρ. None of the glasses has a density of below 2.4 g/cm$^3$. None of the glasses has the desired density and modulus with low Al$_2$O$_3$ content.

TABLE 4.1

| | 20 | 21 | 22 | 23 | 26 | 27 | 28 | 29 |
|---|---|---|---|---|---|---|---|---|
| SiO$_2$ | 70.4 | 70.9 | 71.9 | 72.5 | 68.6 | 69.1 | 70.1 | 70.6 |
| Al$_2$O$_3$ | 8.1 | 8.2 | 6.8 | 6.9 | 8.1 | 8.2 | 6.8 | 6.9 |
| B$_2$O$_3$ | 3.7 | 3.7 | 3.6 | 3.6 | 6.4 | 6.5 | 6.4 | 6.4 |
| Na$_2$O | 12.3 | 10.3 | 12.2 | 10.2 | 11.3 | 9.3 | 11.2 | 9.3 |
| K$_2$O | 0.7 | 2 | 0.7 | 2 | 0.7 | 2 | 0.7 | 2 |
| MgO | 4.7 | 4.8 | 4.7 | 4.7 | 4.8 | 4.8 | 4.7 | 4.7 |
| CaO | 0 | 0 | 0 | 0 | 0 | 0 | 0 | 0 |
| SnO$_2$ | 0.1 | 0.1 | 0.1 | 0.1 | 0.1 | 0.1 | 0.1 | 0.1 |
| Density (g/cm$^3$) | 2.41 | 2.4 | 2.41 | 2.4 | 2.4 | 2.39 | 2.4 | 2.39 |
| E-modulus (GPa) | 73.291113 | 73.2135623 | 72.4559939 | 72.3698046 | 74.4944231 | 74.4332161 | 73.6872537 | 73.54366 |
| E/ρ (*$10^6$m$^2$/s$^2$) | 304.112502 | 305.056509 | 300.647278 | 301.540852 | 310.393429 | 311.436051 | 307.030224 | 307.714059 |

TABLE 4.2

| | 76 | 77 | 78 | 79 | 80 | 81 | 82 | 83 |
|---|---|---|---|---|---|---|---|---|
| SiO$_2$ | 70.6 | 69.1 | 69.2 | 68.7 | 70.1 | 70.1 | 69.6 | 69.2 |
| Al$_2$O$_3$ | 8.7 | 8.7 | 8.8 | 8.8 | 8.7 | 8.8 | 8.7 | 8.8 |
| MgO | 4.8 | 4.8 | 4.8 | 4.8 | 4 | 4 | 4 | 4.8 |
| B$_2$O$_3$ | 2.7 | 3.7 | 3.3 | 3.4 | 3.5 | 3.6 | 3.8 | 2.6 |
| Li$_2$O | 0 | 0.02 | 0 | 0 | 0 | 0 | 0 | 0.02 |
| Na$_2$O | 12.4 | 12.9 | 12.8 | 12.9 | 12.9 | 12.4 | 12.5 | 13.9 |
| K$_2$O | 0.7 | 0.7 | 1 | 1.3 | 0.7 | 1 | 1.3 | 0.7 |
| SnO$_2$ | 0.1 | 0.1 | 0.1 | 0.1 | 0.1 | 0.1 | 0.1 | 0.1 |
| Density (g/cm$^3$) | 2.41 | 2.42 | 2.42 | 2.42 | 2.41 | 2.41 | 2.42 | 2.43 |
| E-modulus (GPa) | 73.2593755 | 73.6974959 | 73.4990076 | 73.3150731 | 73.2526187 | 73.4085896 | 73.5018026 | 73.1797672 |
| E/ρ (*$10^6$m$^2$/s$^2$) | 303.980811 | 304.535107 | 303.714908 | 302.954848 | 303.952775 | 304.599957 | 303.726457 | 301.151305 |

TABLE 4.3

|  | 84 | 85 | 86 | 87 | 88 | 89 | 90 | 91 | 92 |
|---|---|---|---|---|---|---|---|---|---|
| $SiO_2$ | 69.7 | 69.9 | 70 | 69.8 | 69.7 | 70.6 | 70.9 | 70.4 | 69.9 |
| $Al_2O_3$ | 8.8 | 8.7 | 8.7 | 8.6 | 8.7 | 8.8 | 8.8 | 8.7 | 8.7 |
| MgO | 4.8 | 4.8 | 4.8 | 4.7 | 4.7 | 4 | 4 | 4 | 3.9 |
| $B_2O_3$ | 1.2 | 2.3 | 1.6 | 1.4 | 0.9 | 2.8 | 2.1 | 1.6 | 0.9 |
| $Li_2O$ | 0.02 | 0.02 | 0.02 | 0.02 | 0.02 | 0.02 | 0.02 | 0.02 | 0.02 |
| $Na_2O$ | 14.7 | 13.7 | 14.4 | 14.9 | 15.5 | 13.3 | 13.7 | 14.8 | 16 |
| $K_2O$ | 0.7 | 0.4 | 0.4 | 0.4 | 0.4 | 0.4 | 0.4 | 0.4 | 0.4 |
| $SnO_2$ | 0.1 | 0.1 | 0.1 | 0.1 | 0.1 | 0.1 | 0.1 | 0.1 | 0.1 |
| Density ($g/cm^3$) | 2.43 | 2.42 | 2.43 | 2.43 | 2.43 | 2.41 | 2.42 | 2.43 | 2.44 |
| E-modulus (GPa) | 72.2730842 | 72.9661817 | 72.6746131 | 72.2922941 | 71.8908841 | 73.0202065 | 72.8702011 | 72.4084246 | 71.8745868 |
| $E/\rho$ ($*10^6 m^2/s^2$) | 297.4201 | 301.513147 | 299.072482 | 297.499153 | 295.84726 | 302.988409 | 301.116533 | 297.977056 | 294.567979 |

Prior art document EP 2 796 426 A1 discloses further glasses that are shown in the tables below. None of the glasses has the desired density and modulus with low $Al_2O_3$ content.

TABLE 5.1

|  | A | B | C | D | E | F |
|---|---|---|---|---|---|---|
| $SiO_2$ | 70.8 | 72.8 | 74.8 | 76.8 | 76.8 | 77.4 |
| $Al_2O_3$ | 7.5 | 7 | 6.5 | 6 | 6 | 7 |
| $Na_2O$ | 13.7 | 12.7 | 11.7 | 10.7 | 11.6 | 10 |
| $K_2O$ | 1 | 1 | 1 | 1 | 0.1 | 0.1 |
| MgO | 6.3 | 5.8 | 5.3 | 4.8 | 4.8 | 4.8 |
| CaO | 0.5 | 0.5 | 0.5 | 0.5 | 0.5 | 0.5 |
| $SnO_2$ | 0.2 | 0.2 | 0.2 | 0.2 | 0.2 | 0.2 |
| Density ($g/cm^3$) | 2.43838578 | 2.425128 | 2.41065774 | 2.39498374 | 2.39500279 | 2.38690093 |
| E-modulus (GPa) | 71.4784098 | 71.1719441 | 70.8286853 | 70.4487711 | 70.5616302 | 71.6879501 |
| $E/\rho$ ($*10^6 m^2/s^2$) | 293.138232 | 293.477062 | 293.814772 | 294.151355 | 294.620242 | 300.339027 |

TABLE 5.2

|  | G | H | 1 | 1 | 2 | 3 |
|---|---|---|---|---|---|---|
| $SiO_2$ | 76.965 | 76.852 | 76.962 | 76.919 | 76.96 | 77.156 |
| $Al_2O_3$ | 5.943 | 6.974 | 7.958 | 8.95 | 4.977 | 3.997 |
| $Na_2O$ | 11.427 | 10.473 | 9.451 | 8.468 | 12.393 | 13.277 |
| $K_2O$ | 0.101 | 0.1 | 0.102 | 0.105 | 0.1 | 0.1 |
| MgO | 4.842 | 4.878 | 4.802 | 4.836 | 4.852 | 4.757 |
| CaO | 0.474 | 0.478 | 0.481 | 0.48 | 0.468 | 0.462 |
| $SnO_2$ | 0.198 | 0.195 | 0.197 | 0.197 | 0.196 | 0.196 |
| Density ($g/cm^3$) | 2.388 | 2.384 | 2.381 | 2.382 | 2.392 | 2.396 |
| E-modulus (GPa) | 70.4070598 | 71.3862325 | 72.3762273 | 73.4885151 | 69.4723465 | 68.5497881 |
| $E/\rho$ ($*10^6 m^2/s^2$) | 294.836934 | 299.438895 | 303.974075 | 308.516016 | 290.436231 | 286.100952 |

TABLE 5.3

|  | J | K | L | 4 | 5 | 6 |
|---|---|---|---|---|---|---|
| $SiO_2$ | 76.99 | 77.1 | 77.1 | 77.01 | 76.97 | 77.12 |
| $Al_2O_3$ | 5.98 | 5.97 | 5.96 | 5.96 | 5.97 | 5.98 |
| $Na_2O$ | 11.38 | 11.33 | 11.37 | 11.38 | 11.4 | 11.34 |
| $K_2O$ | 0.1 | 0.1 | 0.1 | 0.1 | 0.1 | 0.1 |
| MgO | 5.23 | 4.79 | 3.78 | 2.83 | 1.84 | 0.09 |
| CaO | 0.07 | 0.45 | 1.45 | 2.46 | 3.47 | 5.12 |
| $SnO_2$ | 0.2 | 0.19 | 0.19 | 0.19 | 0.19 | 0.19 |
| Density ($g/cm^3$) | 2.384 | 2.387 | 2.394 | 2.402 | 2.41 | 2.42 |

TABLE 5.3-continued

|  | J | K | L | 4 | 5 | 6 |
|---|---|---|---|---|---|---|
| E-modulus (GPa) | 70.4365858 | 295.123573 | 70.3395635 | 70.285402 | 70.2285741 | 70.0687577 |
| E/ρ (*10⁶m²/s²) | 295.499079 | 295.123573 | 293.816055 | 292.611998 | 291.404872 | 289.540321 |

TABLE 5.4

|  | M | N | O | 7 | 8 | 9 |
|---|---|---|---|---|---|---|
| $SiO_2$ | 76.86 | 76.778 | 76.396 | 74.78 | 73.843 | 72.782 |
| $Al_2O_3$ | 5.964 | 5.948 | 5.919 | 5.793 | 5.72 | 5.867 |
| $B_2O_3$ | 0 | 0.214 | 0.777 | 2.84 | 4.443 | 4.636 |
| $Na_2O$ | 11.486 | 11.408 | 11.294 | 11.036 | 10.58 | 11.099 |
| $K_2O$ | 0.101 | 0.1 | 0.1 | 0.098 | 0.088 | 0.098 |
| MgO | 4.849 | 4.827 | 4.801 | 4.754 | 4.645 | 4.817 |
| CaO | 0.492 | 0.48 | 0.475 | 0.463 | 0.453 | 0.465 |
| $SnO_2$ | 0.197 | 0.192 | 0.192 | 0.188 | 0.183 | 0.189 |
| Density (g/cm³) | 2.388 | 2.389 | 2.39 | 2.394 | 2.392 | 2.403 |
| E-modulus (GPa) | 70.3920964 | 70.5336512 | 70.8095063 | 71.756441 | 72.4734649 | 72.7412116 |
| E/ρ (*10⁶m²/s²) | 294.774273 | 295.243412 | 296.274085 | 299.734507 | 302.982713 | 302.709994 |

Regarding the densities, the values given in U.S. Patent Application Publication No. 2015/0152003 were used. Where no densities were given, the respective values have been calculated according to Fluegel, Global Model for Calculating Room-Temperature Glass Density from the Composition, J. Am. Ceram. Soc., 90 [8]2622-2625 (2007), wherein $SnO_2$ was treated as "remainder". There was no need for normalization because the proportions added up to 100%. Young's modulus was obtained according to Makishima and Mackenzie, wherein compositions were normalized to obtain 100%, if necessary.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A borosilicate glass article, comprising a glass comprising a composition comprising $B_2O_3$ and $Na_2O$ and a ratio $B_2O_3/Na_2O$ in mol % of less than 1.20 and further having a diffusivity of 6 μm²/h to 25 μm²/h and a hydrolytic resistance of HGA1 according to ISO720:1985, wherein the composition comprises (in mol % on oxide basis):

| $SiO_2$ | 65.0-80.0; |
|---|---|
| $B_2O_3$ | 3.0-10.0; |
| $Al_2O_3$ | 3.0-8.0; |
| $Na_2O$ | 8.0-12.5; and |
| MgO | >0-3.2, wherein the composition has a ratio of $B_2O_3$/MgO in mol% that is less than 10.0. |

2. The glass article of claim 1, wherein the composition comprises 3.6-8.5 mol % $B_2O_3$.

3. The glass article of claim 1, wherein the composition comprises (in mol % on oxide basis):

| $Li_2O$ | 0-2.5; |
|---|---|
| $K_2O$ | 0-2.0; and |
| CaO | 0-2.5. |

4. The glass article of claim 1, wherein the composition comprises CaO and a cumulative amount of MgO and CaO is less than 4 mol %.

5. The glass article of claim 1, wherein the composition has a ratio of $B_2O_3$/MgO in mol % of at least 1.4.

6. The glass article of claim 3, wherein a ratio of molar concentrations of $B_2O_3$ relative to the sum of concentrations of $B_2O_3$ and $Al_2O_3$ is at least 0.30.

7. The glass article of claim 1, wherein the ratio $B_2O_3/Na_2O$ in mol % is at least 0.10.

8. The glass article of claim 3, wherein the composition further comprises (in mol % on oxide basis): one or more refining agents 0.01-2.0.

9. The glass article of claim 1, wherein the glass exhibits a compaction of from 20 to 70 μm per 100 mm article length.

10. The glass article of claim 1, wherein the diffusivity is from 6.3 μm²/h to 20.5 μm²/h.

11. The glass article of claim 1, wherein the glass has a coefficient of thermal expansion ($CTE_{20\ to\ 300°c}$) of from $5.1*10^{-6}$/K to $7.3*10^{-6}$/K.

12. The glass article of claim 1, wherein the glass has a crystallization rate not exceeding a limit of 0.1 μm/min in a temperature range limited by a liquidus temperature and a temperature at which a viscosity of the glass is $10^{6.5-7.0}$ dPa·s.

13. The glass article of claim 1, wherein a ratio E/ρ of Young's E modulus to density ρ of the glass is at least $303*10^6$ m²/s².

14. The glass article of claim 1, wherein the article is chemically tempered to have at least one of a compressive stress >400 MPa or a penetration depth DoL >20 μm.

15. A method of making a glass article, the method comprising:

drawing a glass melt to form the glass article or a glass article precursor, the glass melt comprising a composition comprising $B_2O_3$ and $Na_2O$ and a ratio $B_2O_3/Na_2O$ in mol % of less than 1.20 and further having a diffusivity of 6 µm²/h to 25 µm²/h and a hydrolytic resistance of HGA1 according to ISO720:1985, wherein the composition comprises (in mol % on oxide basis):

| | |
|---|---|
| $SiO_2$ | 65.0-80.0; |
| $B_2O_3$ | 3.0-10.0; |
| $Al_2O_3$ | 3.0-8.0; |
| $Na_2O$ | 8.0-12.5; and |
| MgO | >0-3.2, wherein the composition has a ratio of $B_2O_3$/MgO in mol % that is less than 10.0; and | cooling the glass article or the glass article precursor.

16. A pharmaceutical product, comprising:

a glass article comprising a glass comprising a composition comprising $B_2O_3$ and $Na_2O$ and a ratio $B_2O_3/Na_2O$ in mol % of less than 1.20 and further having a diffusivity of 6 µm²/h to 25 µm²/h and a hydrolytic resistance of HGA1 according to ISO720:1985, wherein the composition comprises (in mol % on oxide basis):

| | |
|---|---|
| $SiO_2$ | 65.0-80.0; |
| $B_2O_3$ | 3.0-10.0; |
| $Al_2O_3$ | 3.0-8.0; |
| $Na_2O$ | 8.0-12.5; and |
| MgO | >0-3.2, wherein the composition has a ratio of $B_2O_3$/MgO in mol % that is less than 10.0; and | a drug formulation contained in the glass article.

* * * * *